April 14, 1936.   J. A. HUBERTI ET AL   2,037,328
HYDROMETER
Filed Dec. 11, 1933
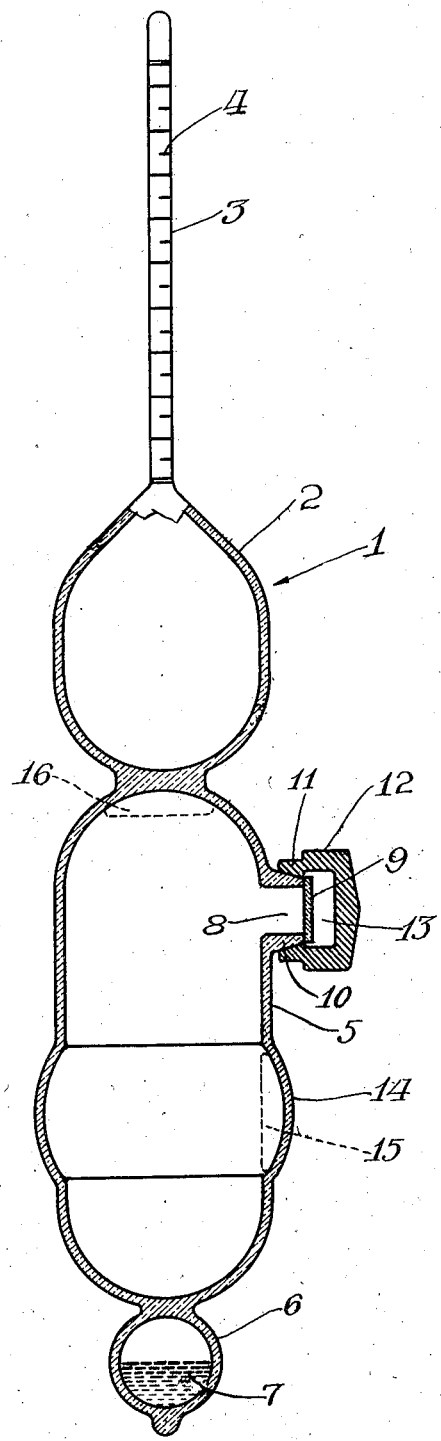
INVENTORS
John A. Huberti
Harold J. Lawrence
BY Lee J. Gary
ATTORNEY Patented Apr. 14, 1936

2,037,328

UNITED STATES PATENT OFFICE 2,037,328

HYDROMETER

John A. Huberti and Harold J. Lawrence, Chicago, Ill.; said Huberti assignor to Stromberg Motoscope Corporation, Chicago, Ill., a corporation of Illinois Application December 11, 1933, Serial No. 701,760

3 Claims. (Cl. 265—45)

This invention relates to improvements in hydrometers and refers specifically to an improved hydrometer of the Eichhorn type by which measurements of densities or specific gravities of liquid may be obtained to a greater degree of accuracy than has heretofore been possible by hydrometers of this general type.

The utility, objects and advantages of our invention will be apparent from the accompanying drawing and following detailed description.

The single figure comprising the drawing illustrates a longitudinal sectional view, parts being shown in elevation, of the hydrometer comprising our invention.

Referring in detail to the drawing, 1 indicates a hydrometer which may be constructed of glass or any other suitable material. The hydrometer 1 may comprise a float chamber 2 which terminates at its upper end in stem 3, upon which calibrated indicia 4 may be inscribed. The lower end of float chamber 2 may be integrally attached to the upper portion of chamber 5 which is adapted to carry the liquid, the specific gravity of which is to be measured. A ballast compartment 6 may be integrally connected to the lower end of chamber 5 and may contain ballast 7, preferably a predetermined quantity of mercury.

As is well known to the art, the Eichhorn type of hydrometer is similar, in general, to the hydrometer 1, having a float chamber, calibrated stem, liquid chamber and ballast chamber. In using this type of hydrometer a previously measured quantity of liquid is introduced into the liquid chamber which corresponds generally to chamber 5, said chamber being provided with a ground glass stopper. The hydrometer is then immersed in a liquid of known physical characteristics and the depth to which the hydrometer sinks is ascertained from the calibrated stem and interpreted in terms of specific gravity.

However, under no circumstances is the liquid chamber of the usual Eichhorn hydrometer completely filled with liquid, since no provision is made for the expansion of the liquid in the event of a rise of temperature. Inasmuch as the amount of liquid, the specific gravity of which is to be measured, is determined before introduction into the liquid chamber, it is unnecessary to note accurately the internal volume of the liquid chamber. However, a serious error creeps into the measurement of the specific gravity by this type instrument due to the substantial impossibility of precisely measuring a given quantity of liquid and then transferring the entire measured quantity to the liquid chamber of the hydrometer.

In the hydrometer comprising our invention it is unnecessary to previously measure the liquid under test and, consequently, the error inherent in using the ordinary Eichhorn hydrometer hereinbefore mentioned is eliminated. In the embodiment of our invention illustrated the internal volume of the chamber 5 is accurately predetermined and when used is completely filled with the liquid to be tested.

The chamber 5 may be provided with a mouth 8 through which the liquid to be tested may be inserted into the liquid chamber. The mouth 8 may be formed upon a side wall of the liquid chamber and is adapted to be closed by means of disk 9. The neck 10 defining mouth 8 may have a conically tapered external surface 11 upon which a cap 12 is adapted to be seated, the mouth of the cap being tapered in conformity with the taper 11 and being ground to accurately fit said taper. When filling the chamber 5, the hydrometer 1 may be canted to a position of approximately 45° and the liquid may be inserted through mouth 8. As the liquid level within the chamber 5 rises, the hydrometer may be slowly rocked to a horizontal position. In this manner air bubbles will be prevented from being trapped within the chamber 5. When in the horizontal position, the mouth 8 may be completely filled with liquid and a meniscus may form at the neck. The disk 9 may then be positioned over the mouth 8 by sweeping or sliding the disk across the defining edge of said mouth, shearing the meniscus. In this manner, the quantity of liquid carried by the chamber 5 is accurate within negligible limits.

The cap 12 is so constructed that a space 13 is provided between the disk 9 and the internal portion of said cap and when the hydrometer is disposed vertically, cap 9 slides from the mouth 8 and permits communication between the chamber 5 and the interior of the cap. In this manner, even though the chamber 5 was originally completely filled with liquid, said liquid may expand in the event of a rise in temperature by the provision of the addition to the internal volume of the chamber afforded by the space 13. The hydrometer may be immersed in a liquid whose physical characteristics are known and inasmuch as the external volume of the hydrometer including the cap 12 is known, and the quantity of liquid introduced into the chamber 5 is also known with accuracy, the specific gravity of said liquid may be accurately determined by noting the depth to which the hydrometer sinks.

As another feature of our invention, an annular bulge or belly 14 may be formed intermediate the length of chamber 5. The purpose of said bulge will be hereinafter more fully described.

It is of importance that the liquid in chamber 5 be well stirred in order to equalize its temperature. Hence, when chamber 5 is being filled, hydrometer 1 may be positioned horizontally, with mouth 8 opening upwardly. Liquid may be introduced into the chamber and consequently an air bubble 15 will be trapped in the then upper portion of the bulge 14. The hydrometer may then be gently rocked about its transverse axis and the air bubble will travel back and forth in the liquid thus stirring the liquid and tending to equalize its temperature. After the liquid has been so stirred, the hydrometer may be tilted to about 45° and the air bubble will escape towards the mouth. When the hydrometer is then tilted back to the horizontal position, chamber 5 may be completely filled with liquid.

In the event that specific gravities of liquids are to be determined which require a lesser degree of accuracy, the chamber 5 may be filled with the hydrometer lying in horizontal position and thus an air bubble will be left in the uppermost portion of the belly 14, while the liquid overflows at the mouth 8 and forms a meniscus. The chamber 5 may then be closed by means of cap 12 without the use of disk 9, and when the hydrometer is brought to vertical position, the air bubble 15 would appear at 16. In this case the inside volume would be kept within the tolerance required for such lesser accuracies and an expansion space would be created at 16, which would be augmented by the addition of the air formerly confined in space 13 in cap 12.

As has been hereinbefore described, hydrometers constructed according to the concepts of our invention eliminate serious errors inherent in instruments of the same general type. Consequently, the overall percentage of error in instruments of the type herein described is materially smaller than the best instruments heretofore constructed.

We claim as our invention:

1. An hydrometer of the Eichhorn type having as an integral structure, a float chamber, a ballast chamber and a chamber intermediate said float and ballast chambers of predetermined internal volume adapted to be filled with liquid, the specific gravity of which is to be tested, said last mentioned chamber having a mouth through which said liquid is introduced into said chamber, and a cap covering said mouth, said cap being provided with an internal space normally in communication with the interior of said last mentioned chamber whereby said liquid may expand into said last mentioned chamber.

2. An hydrometer of the Eichhorn type having as an integral structure, a float compartment, a ballast compartment and a chamber intermediate said compartments of predetermined internal volume adapted to be filled with liquid, the specific gravity of which is to be tested, a neck defining a mouth provided in said chamber, the interior of said neck comprising a portion of the internal volume of the chamber, and a cap mounted upon said neck, said cap being provided with an internal space normally in communication with the interior of said chamber whereby said liquid may expand into said chamber.

3. An hydrometer of the Eichhorn type having a substantially cylindrical chamber of predetermined internal volume normally adapted to be filled with liquid, the specific gravity of which is to be tested, a neck defining a mouth formed on a side wall of said cylindrical compartment, a belly formed intermediate the length of the cylindrical compartment upon the same side of the cylinder as the side carrying the neck whereby an air bubble may be trapped in the chamber when said chamber and neck is filled with liquid, and a cap mounted upon said neck, said cap being provided with an internal space normally in communication with the interior of said compartment.

JOHN A. HUBERTI.
HAROLD J. LAWRENCE.